United States Patent [19]
Nakaya et al.

[11] Patent Number: 5,458,213
[45] Date of Patent: Oct. 17, 1995

[54] FULLY ADJUSTABLE MOTORCYCLE

[75] Inventors: Kazumasa Nakaya; Ichiro Kurawaki; Toyoji Tanaka, all of Iwata, Japan

[73] Assignee: Yamaha Hatsudoki Kabushiki Kaisha, Shizuoka, Japan

[21] Appl. No.: 196,773

[22] Filed: Feb. 14, 1994

Related U.S. Application Data

[63] Continuation of Ser. No. 852,749, Mar. 17, 1992, abandoned, which is a continuation of Ser. No. 601,444, Oct. 22, 1990, abandoned.

[30] Foreign Application Priority Data

Oct. 24, 1988 [JP] Japan .................. 1-276546
Oct. 24, 1989 [JP] Japan .................. 1-274881

[51] Int. Cl.⁶ .................................................. B62K 11/14
[52] U.S. Cl. .......................... 180/219; 280/270; 280/278; 280/291; 74/551.3; 74/551.5; 74/564
[58] Field of Search .................................. 280/278, 287, 280/263, 291, 281.1, 270, 274; 180/219, 222, 551.5; 74/551.3, 551.4, 564, 551.1, 551.6

[56] References Cited

U.S. PATENT DOCUMENTS

| | | | |
|---|---|---|---|
| 516,902 | 3/1894 | Smith | 280/291 |
| 1,164,122 | 12/1915 | Yves | 180/219 |
| 1,261,442 | 4/1918 | Rigby | 280/291 |
| 2,908,510 | 10/1959 | Lossau | 180/219 |
| 3,337,240 | 8/1967 | Rizzato | 280/281.1 |
| 3,521,904 | 3/1968 | Sheffer | 280/270 |
| 3,548,963 | 12/1970 | Schlaphoff | 74/551.3 |
| 3,794,353 | 2/1974 | Oliver | 280/291 |
| 4,456,090 | 6/1984 | Malenotti | 180/219 |
| 4,540,189 | 9/1985 | Tanaka | 280/270 |
| 4,611,818 | 9/1986 | Cammarata | 74/551.4 |
| 4,616,840 | 10/1986 | Green | 280/270 |
| 4,909,537 | 3/1990 | Tratner | 280/278 |

FOREIGN PATENT DOCUMENTS

| | | | |
|---|---|---|---|
| 0174484 | 1/1917 | Canada | 280/263 |
| 0929845 | 1/1948 | France | 74/551.5 |
| 1003619 | 2/1957 | Germany | 74/551.3 |
| 0605614 | 7/1948 | United Kingdom | 74/551.3 |
| 9003302 | 4/1990 | WIPO | 74/551.3 |

*Primary Examiner*—Anne Marie Boehler
*Attorney, Agent, or Firm*—Knobbe, Martens, Olson & Bear

[57] ABSTRACT

Several embodiments of fully adjustable motorcycles so as to permit the use of a single motorcycle as either a touring or racing machine. The handlebar assembly is adjustable along an arc as are the foot pegs with the center of movement of the arc being midway disposed between the handlebar and the foot pegs. This permits the rider to assume either an upright touring position, or a reclined, crouched racing position. The seat is also adjustable and the adjustment further accommodates riders of varying stature.

18 Claims, 14 Drawing Sheets

FULLY ADJUSTABLE MOTORCYCLE

This is a continuation of U.S. patent application Ser. No. 07/852,749, filed Mar. 17, 1992, now abandoned, which is a continuation of U.S. patent application 07/601,444, Filed Oct. 22, 1990, now abandoned.

BACKGROUND OF THE INVENTION

This invention relates to a fully adjustable motorcycle and more particularly to a motorcycle constructed in such a way as to accommodate a wide variety of riding positions and individuals of varying stature.

It is well known that there are a wide variety of types of motorcycles, each generally geared to a certain type of rider. For example, there are the so-called "racing bikes" in which the rider operates in a substantially crouched position so as to afford low wind resistance, low center of gravity and high performance. In addition, there are the "touring bikes" in which the rider is seated in more an upright position for cross country touring. Obviously, many motorcycle riders enjoy both racing and touring operation. With the types of motorcycles heretofore proposed, it has been necessary for a single rider to own more than one motorcycle in order to enjoy all types of riding.

It is, therefore, a principal object of this invention to provide an improved motorcycle construction that is adjustable so that the rider may assume either a racing or a touring posture on the same motorcycle.

It is a further object of this invention to provide an improved motorcycle construction that is adjustable so as to accommodate a wide variety of riding positions.

The positioning of the handlebar relative to the seat is a determinative factor in whether a bike is a touring bike or a racing bike. Therefore, in order to provide a motorcycle that is adjustable between both touring and racing configurations, it would be essential to provide an arrangement for adjusting the handlebar position.

It is, therefore, a further object of this invention to provide an improved handlebar adjustment mechanism for a motorcycle that permits the handlebar assembly to be positioned in either a racing or a touring configuration.

In addition to the positioning of the handlebars, the positioning of the foot pegs of a motorcycle vary depending upon the application. That is, with a racing bike, the foot pegs are normally placed high and to a rearward position so as to permit the rider to operate in a crouched and semi inclined position. With a touring bike, on the other hand, the foot peg should be positioned lower and forward.

It is, therefore, a further object of this invention to provide an improved foot peg arrangement and adjusting mechanism therefore that will permit the rider to assume either a racing or touring position on the same motorcycle.

In addition to the variation in the height position and fore and aft location of the handlebars for either touring or racing operation, the position of the handle grips relative to the longitudinal center of the motorcycle also varies between racing and touring bikes. With a racing bike, it is the practice to have the handle grips positioned close to the longitudinal center line of the motorcycle. In a touring bike, on the other hand, the handle grips are spaced more widely apart from the longitudinal center line.

It is, therefore, a still further object of this invention to provide an improved adjustable handle grip arrangement for a motorcycle in which the handle grips may be positioned simultaneously in either a touring or a racing position.

In addition to the differences in riding position between racing and touring bikes, there is also the question of adaptation of a given motorcycle to riders of varying stature. It is, of course, desirable if the motorcycle can be adjusted so as to accommodate riders of varying stature. These problems obviously become more acute when the motorcycle is also designed so as to be adjustable for operation in either racing or touring positions.

It is, therefore a still further object of this invention to provide a motorcycle construction wherein the handlebar location, foot peg location and seat position may be adjusted to accommodate riders of varying stature and wherein adjustment of those components between racing and touring positions is also possible.

SUMMARY OF THE INVENTION

The features of the invention are all adapted to be embodied in a motorcycle construction for permitting a rider to assume either a crouched racing position or an upright touring position and in which a motorcycle includes a frame assembly that journals front and rear wheels with the front wheel being dirigible for steering of the motorcycle.

In accordance with one feature of the invention, a handlebar assembly is operatively connected to the front wheel for steering of the front wheel. Means mount the handlebar assembly for movement relative to the frame assembly generally along an arc about an axis extending transversely to the frame assembly between a lowered, forward position for racing posture and an elevated, rearward position for touring posture.

In accordance with another feature of the invention, a foot peg assembly is carried by the frame assembly and is designed to accommodate a rider's feet. The foot peg assembly is movably supported by the frame assembly along a general arc between a lower, forward touring position and an upward, rearward racing position.

In accordance with yet another feature of the invention, a handlebar assembly is operatively connected to the front wheel for steering of the front wheel. The handlebar assembly has a pair of hand grips carried at its outer periphery and which are simultaneously adjustable along an arc between a position spaced closely to the longitudinal center line of the position for racing operation and a position spaced outwardly from the longitudinal center line for touring operation.

DETAILED DESCRIPTION OF THE PREFERRED EMBODIMENTS

Figure 1:
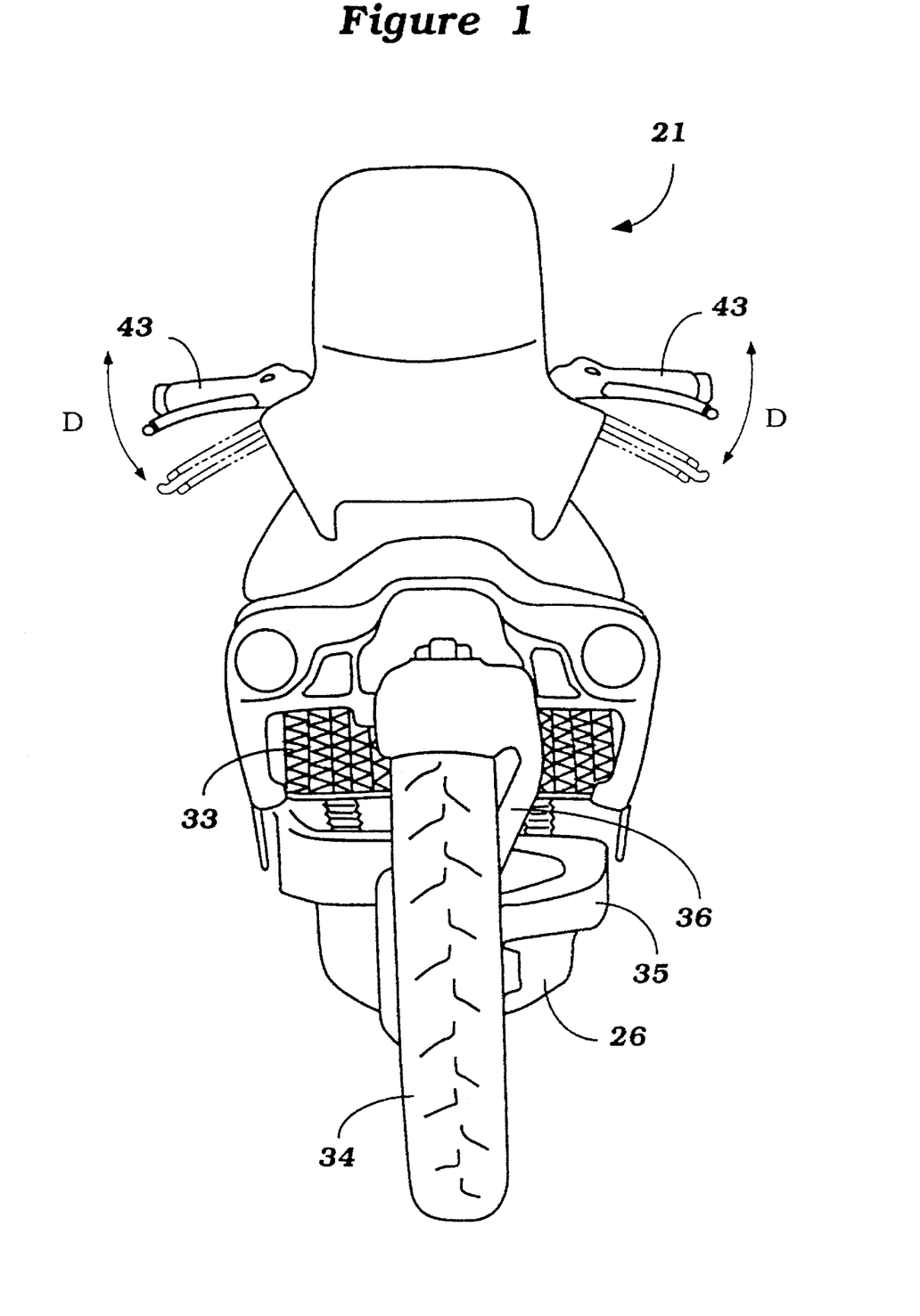
FIG. 1 is a front elevational view of a fully adjustable motorcycle constructed in accordance with an embodiment of the invention.
Figure 2:
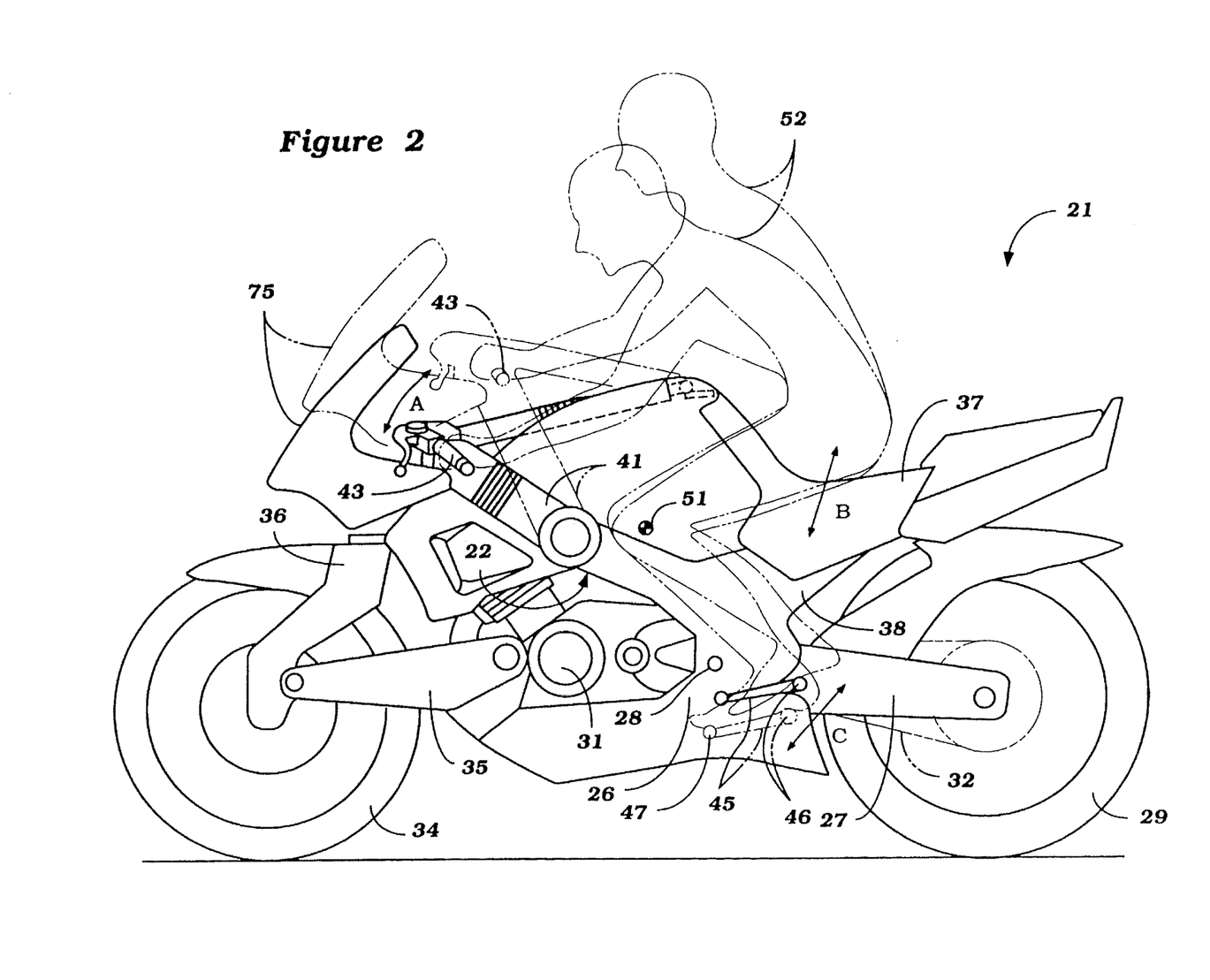
FIG. 2 is a side elevational view thereof.
Figure 4:
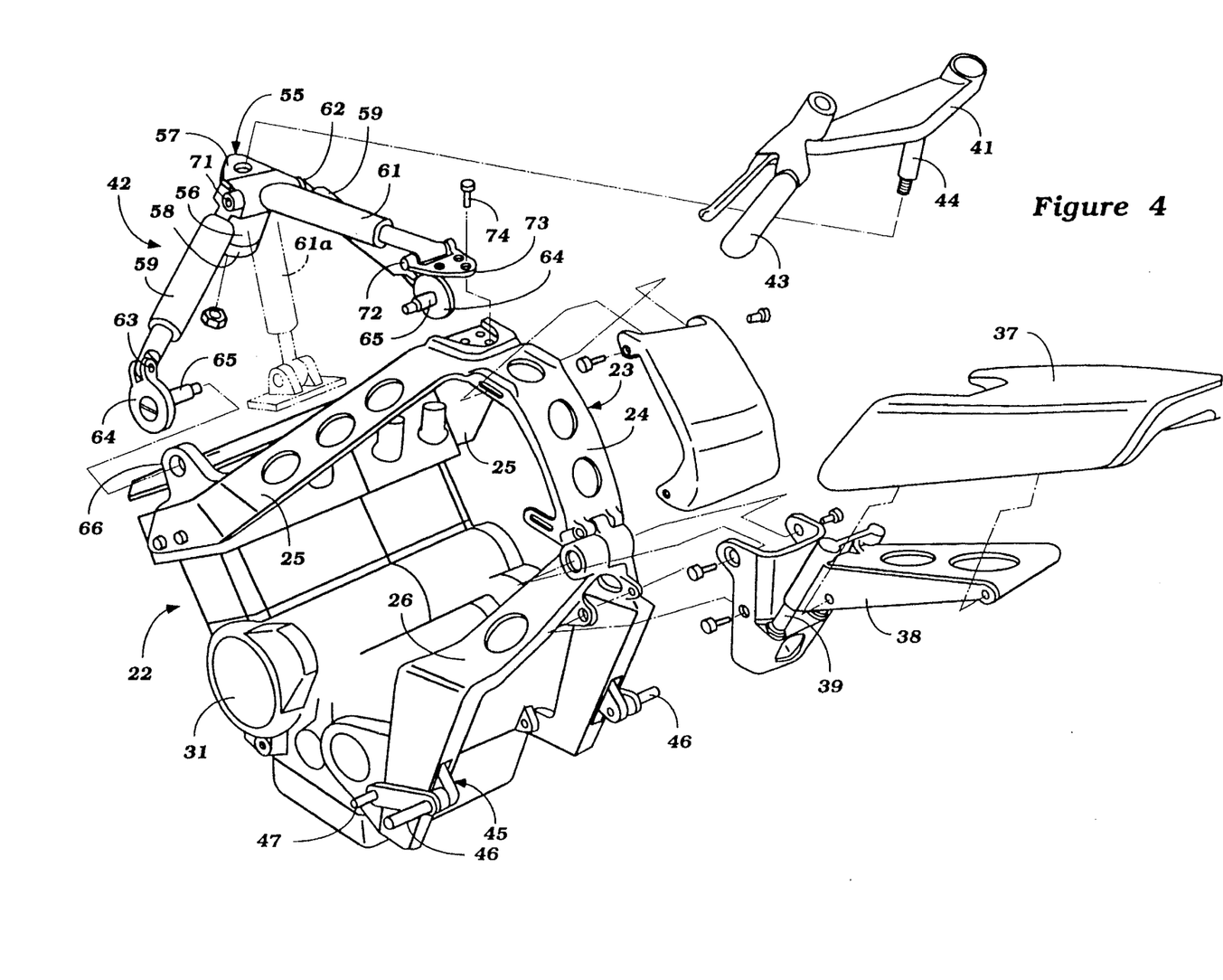
FIG. 4 is a partially exploded perspective view showing the frame assembly, handlebar, seat and foot peg mounting.

Referring first to FIGS. 1, 2 and 4, a fully adjustable motorcycle constructed in accordance with an embodiment of the invention is depicted generally and is identified by the reference numeral 21. The motorcycle 21 is comprised of a frame assembly, indicated generally by the reference numeral 22 and which is made up of a number of welded components including a main frame member 23 that has a seat mounting portion 24 and a pair of spaced apart, forwardly extending arms 25. A forging assembly or weldment 26 is provided at the rear of the main frame member 23 and is connected suitably to this main frame member. A trailing arm 27 is pivotally supported in a suitable manner to the main frame assembly 22 for pivotal movement about a pivot axis 28. A rear wheel 29 is journaled in an appropriate manner at the rear end of the trailing arm 27.

A combined engine/transmission assembly 31 is carried in a suitable manner by the frame assembly 22 and drives the rear wheel 29 through a chain 32. The type of engine 31 and drive arrangement employed for driving the rear wheel 29 may be varied. In the illustrated embodiment, however, the power unit 31 is a transversely disposed, four cylinder, in line engine that is water cooled and to this end a cooling radiator 33 is mounted transversely across the front portion of the frame assembly 22 in a suitable manner.

A front wheel 34 is journaled at the forward end of a leading arm 35 which is, in turn, pivotally supported by the frame assembly 22 in a suitable manner. The support for the front wheel 34 on the arm 35 is such that the wheel 34 is dirigible relative to the arm 35 for steering of the motorcycle. A front fork assembly 36 is about a generally vertically aligned steering axis carried at the forward end of the arm 35 and serves to provide this steering for the front wheel.

A seat 37 is affixed to a seat carrier 38 which is, in turn, connected to the frame assembly and particularly the weldment or forging 26. The seat carrier 38 is provided with a telescopic assembly 39 that permits the seat 37 to be raised and lowered as shown by the arrow B in FIG. 2 so as to accommodate riders of varying stature.

A handlebar assembly, indicated generally by the reference numeral 41 is supported by means of an adjusting mechanism, indicated generally by the reference numeral 42, at the front of the seat 37. As will become apparent, the handlebar assembly 41 is capable of adjustment along an arc so as to accommodate varying rider positions. A pair of handle grips 43 are adjustably carried at the outer end of the handlebar assembly 41 in a manner so as to also permit their adjustment, as also will be described.

The handlebar assembly 41 has a shaft portion 44 (FIG. 4) that is journaled for rotation and that is coupled through a connection to the front fork 36 for steering of the front wheel 34. This connection may be of a shaft type including a plurality of universal joints and a sliding splined connection so as to accommodate the adjustment of the handlebar assembly 41 relative to the front fork 36. Any suitable mechanism may be utilized for this purpose. Alternatively to a shaft having universal joints and a sliding splined connection, a flexible shaft or the like may also be employed for this connection.

The range of adjustment of the handlebar assembly 41 is shown by the arrow A in FIG. 2. The adjustment of the handle grips 43 relative to the handlebar assembly is indicated by the arrows D in FIG. 1.

A foot peg assembly, indicated generally by the reference numeral 45 is carried at the lower end of the frame assembly 22 in an adjustable manner so that the foot peg assembly 45 may be adjusted through an arc indicated by the arrow C in FIG. 2. The foot peg assembly 45 includes rear foot pegs 46 and front foot pegs 47.

The adjusting mechanism 42 for the handlebar assembly 41 will now be described by particular reference to FIGS. 4 and 5. This adjusting mechanism permits the handlebar assembly 41 to be moved generally through an arc, indicated at 48 in FIG. 3 between a lowered position so that the rider may assume a racing posture or a raised position in which the rider may assume a touring posture. In addition, the adjusting mechanism permits some fore and aft adjustment independent of the up and down adjustment so as to accommodate riders of varying heights. As may be seen in FIG. 3, the arc 49 lies around a transverse center point 51 and encompasses the handlebar assembly 41 and foot pegs 46.

Riders are shown in phantom at 52. These riders, in their racing position, will have their center of gravity 53 at a relatively low point. However, when operating in a touring posture, the center of gravity 53a will be raised along a line 54. The way this is accomplished will become apparent. The handlebar adjusting mechanism permits the handlebars to be moved between a position 41a that accommodates a taller stature rider in a racing position, a position 41b that accommodates a shorter stature rider in racing position, and corresponding raised touring positions 41c and 41d that accommodate the taller and shorter riders in the touring position. The range of adjustment is shown in the shaded line area in FIG. 3. It will be seen that it lies generally along the arc 49.

Figure 5:
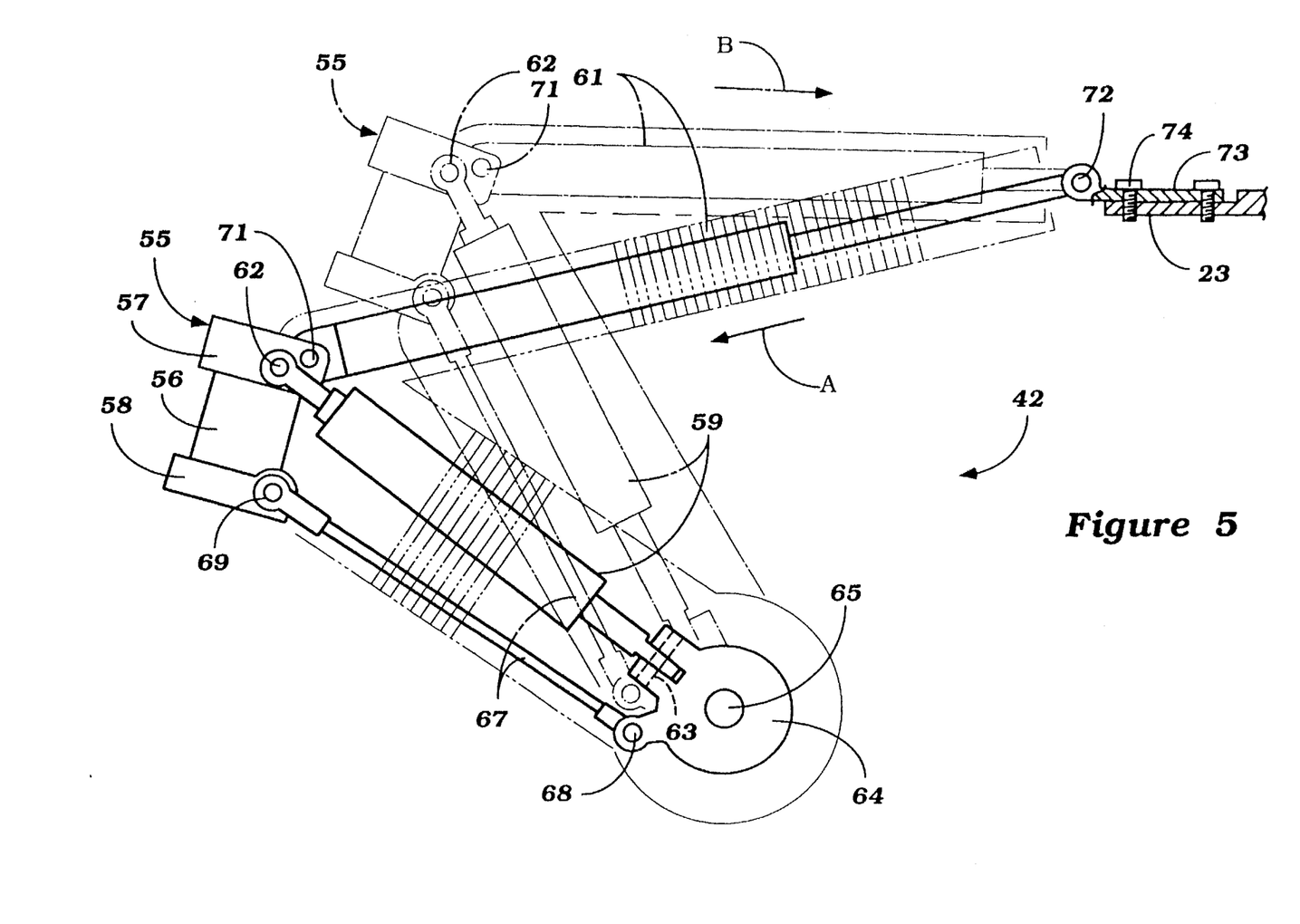
FIG. 5 is a side elevational view showing the handlebar mounting system and the adjustments therefor.

Referring now primarily to FIGS. 4 and 5, the adjusting mechanism 42 includes a journal block 55 which has a tube portion 56 that receives the shaft 44 for journaling the handlebar assembly 41. In this way, the tube portion 56 acts like the head pipe of a conventional motorcycle. Upper and lower bearing plates 57 and 58 are affixed relative to the tube section 56. In the illustrated embodiment, the tube section 56 and journal portion 55 are supported by a pair of angularly disposed hydraulic cylinders 59 and a generally longitudinally disposed hydraulic cylinder 61. The cylinders 59 have pivot connections 62 at their forward ends to the journal assembly 55 and specifically to the top bearing plate 57 thereof. At the opposite ends, the cylinder assemblies 59 have pivotal connections 63 to a respective plate 64 that has a pivot portion 65 that is journaled within a trunion 66 at the forward end of the frame member 25.

A parallel link 67 has one of its ends pivotally connected at 68 to the plate 65. The opposite end of the links 67 are pivotally connected to the lower bearing plate 58 of the journal assembly 55 by a pivot pin 69. As a result of this connection, extension of the cylinder assemblies 59 will permit fore and aft adjustment of the journal assembly 56 between the positions 41b and 41d and the positions 41a and 41c.

The cylinder 61 has a pivotal connection at its forward end to the journal 55 which pivotal connection is shown by the reference numeral 71. The rear end of the cylinder assembly 61 is pivotally connected by means of a pivot pin 72 to a mounting bracket 73 which is, in turn, affixed to the frame member 23 by means of one or more threaded fasteners 74. This linkage construction formed by the cylinders 59 and 61 obviously permits the handlebar assembly 41 to be adjusted through the positions as described. A suitable locking mechanism may be incorporated in the cylinders 59 and 61 so as to hold them in the desired adjusted position.

A cowling assembly 75 may be attached to the journal member 55 in an appropriate manner so that the cowling 75 will move upwardly and downwardly and inwardly and outwardly with the handlebar assembly 41 so as to afford shielding for the rider 52 regardless of the riding posture.

In the illustrated embodiment, the cylinder 61 was disposed in a generally horizontal position. As may be seen in the alternate line position 61a of FIG. 4, the cylinder 61 may be positioned in a vertical orientation. Also, rather than utilizing three cylinders as in the described embodiments, one of the cylinders 59 may be deleted.

Figure 6:
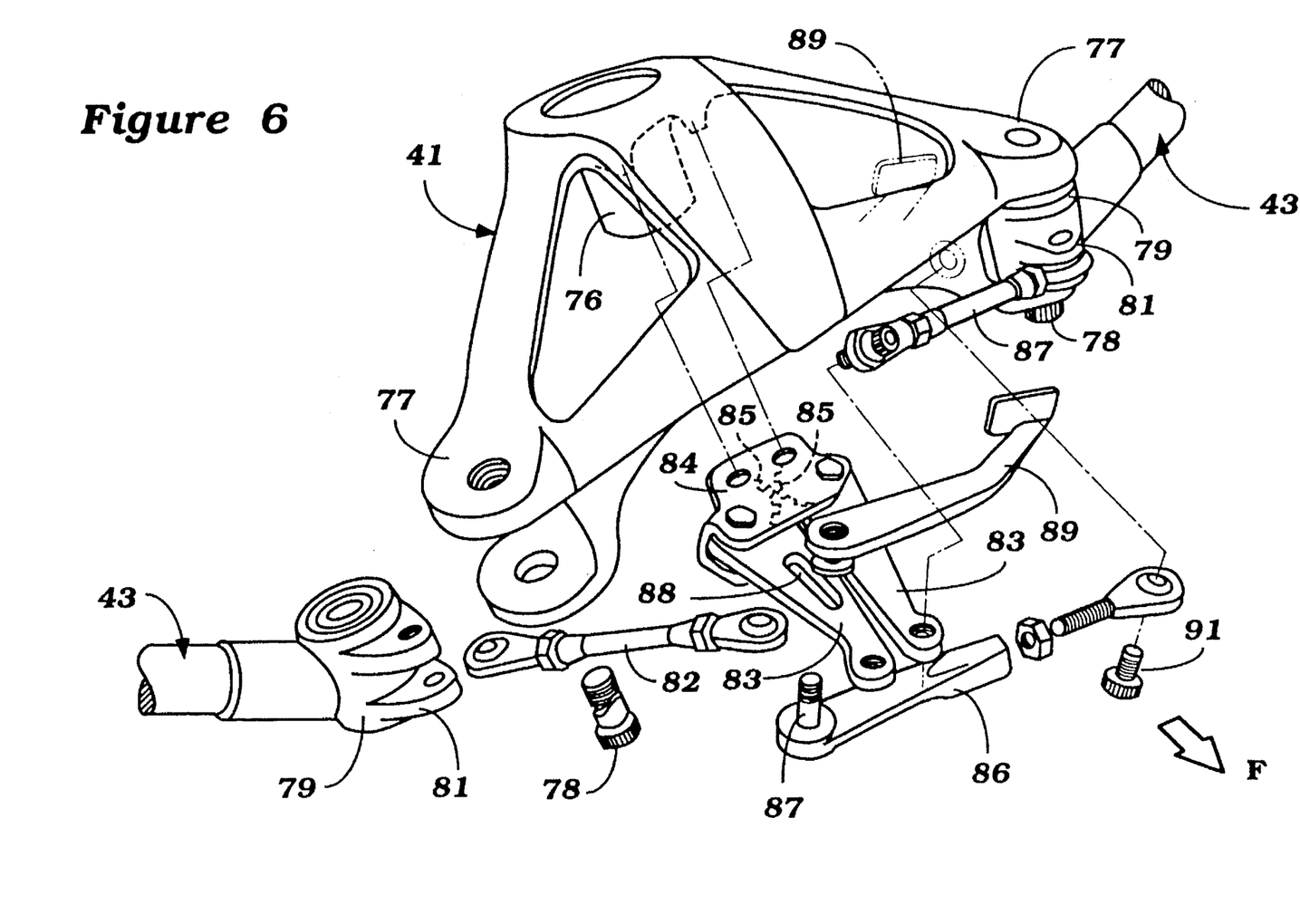
FIG. 6 is a perspective view, partially exploded, showing the adjusting mechanism for the handle grips of the handlebar assembly.
Figure 7:
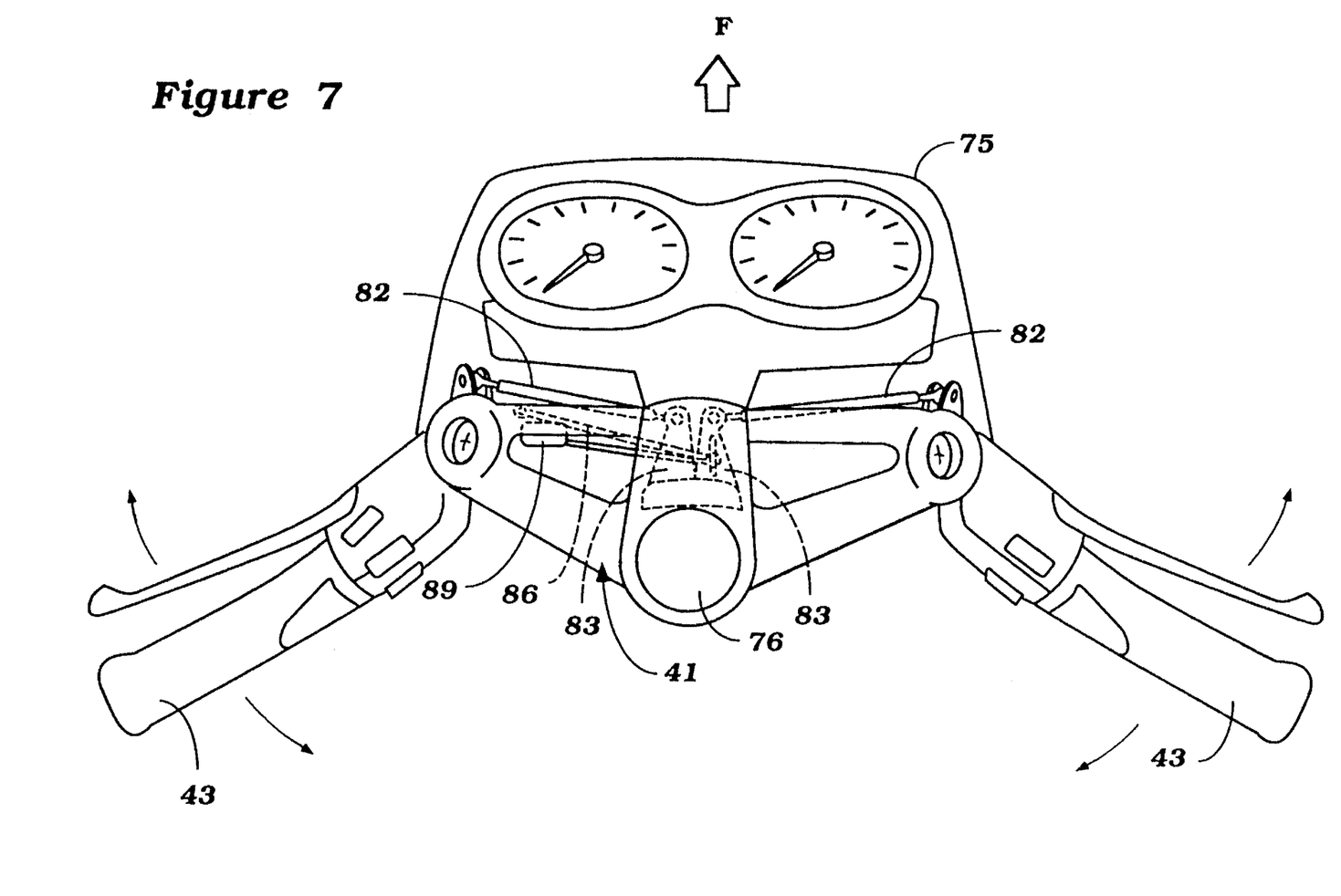
FIG. 7 is a top plan view showing the front cowling, handlebars and handle grips.

In addition to the adjustment of the handlebar assembly 41 as thus far described as accommodated by the adjusting mechanism 42, it also may be possible, as aforenoted, to permit individual adjustment of the handle grips 43. Such a construction is shown in FIGS. 6 and 7. In these figures, the handlebar assembly 41 has a slightly different configuration from that shown in FIGS. 1 through 4 so as to permit this adjustment. However, it should be readily apparent to those skilled in the art how this is accomplished.

Basically, the handlebar assembly 41 has a journal portion 76 to which the shaft 44 of the previously described embodiment may be affixed. There are a pair of bifurcated arm portions 77 that receive pivot pins 78 which pivot pins 78 in turn pass through journal portions 79 of the handle grips 43. There are provided trunion portions 81 on each of the journal portions 79 which journal ends of timing links 82. The opposite ends of the links 82 have pivotal connections to respective arms 83 of a timing mechanism that includes a bearing plate 84 and which is affixed to the handlebar assembly 41 in a suitable manner. The arms 83 have gear sectors 85 formed at their inner ends which cooperate with each other so as to insure that pivotal movement of the arms 83 will occur simultaneously to actuate the timing links 82 and pivot the handle grips 41 in the direction of the arrows shown in FIG. 7.

A locking link 86 has a pin 87 formed at one end which extends through a slot 88 formed in one of the levers 83. A clamping lever 89 is connected to a threaded portion of the pin 87 and when rotated will clamp the arm 83 in its adjusted position. The link 86 is connected by means of a threaded fastener 91 to the handlebar assembly 41 so as to accomplish the locking of the handlebars 43 in their adjusted positions.

The handlebars 43 may be rotated to a close in position relative to the frame assembly 22 for the racing posture or rotated outwardly therefrom in a touring posture. These alternative positions and relative height which may be accomplished through the aforedescribed adjustment of the handlebar assembly 41 as a whole may be seen in FIG. 14.

An adjusting mechanism for the foot pegs 45 will now be described by particular reference to FIGS. 8 through 10. In this embodiment of the invention, the foot peg 45 at each side of the motorcycle 21 is independently adjustable between the racing and touring positions. In addition, adjustment of the fore and aft position at each side is independently adjustable so as to accommodate riders of varying stature. As has been previously noted, the foot peg assembly 45 includes a rearward foot peg 46 and a forward foot peg 47. The forward foot peg 47 is affixed to a lever 92 which is, in turn, pivotally supported at the end of an adjusting lever 93. This pivotal connection is provided by a pivot pin portion 94 of the foot peg 46 which passes through the lever 92 and which is affixed to the end of the adjusting lever 93.

The adjusting lever 93 is pivotally supported by a pivot pin 95 that is affixed to a pair of spaced apart support plates 96 formed as part of the frame assembly 22. These support plates 96 are conveniently attached to the frame weldment 26 as clearly shown in FIG. 9.

An eccentric bearing disk 97 is affixed to the adjusting lever 93 by means of threaded fasteners 98. In addition, a rachet locking plate 99 is affixed by these fasteners also to the eccentric bearing disk 97. The locking plate 99 has oppositely facing rachet teeth 101 and 102 that are normally engaged by means of a pair of locking pawls 103 and 104. The locking pawls 103 and 104 are held in their locked position by means of leaf springs 105 which are all mounted within a mounting assembly 106. A release cam 107 is journaled between the locking pawls 103 and 104 and is connected to a shaft 108 of a lock release 109 having a knob like configuration. When the operator desires to adjust the position of the foot pegs 45, the release knob 109 is moved in one direction or the other so that the release cam 107 will release one of the locking pawls 103 and 104 and permit the foot peg 45 to be adjusted.

A mechanism is incorporated so as to insure that the foot pegs 46 and 47 assume a generally parallel path of travel during their pivotal movement. This is accomplished by means of a bearing block 111 that is affixed around the eccentric bearing member 97. The bearing block 111 has a pair of lugs 112 and 113. The lug 112 has a pivotal connection to one end of a link 114. The opposite end of the link 114 is pivotally connected by means of a pivot pin 115 to a bell crank portion 116 of the lever 92. A further link 117 is pivotally connected to the lug 113 of the bearing plate and extends forwardly to a pivotal connection 118 on the frame 22. The links 114 and 117 cooperate so as to effect slight pivotal movement of the lever 92 when the adjusting arm 93 rotates so as to keep the pegs 46 and 47 in a substantially horizontal position regardless of the adjustment. Fine adjustment of the foot pegs 46 and 47 is accomplished by rotating the pivotal connection 118 to accommodate different stature riders.

Figure 3:
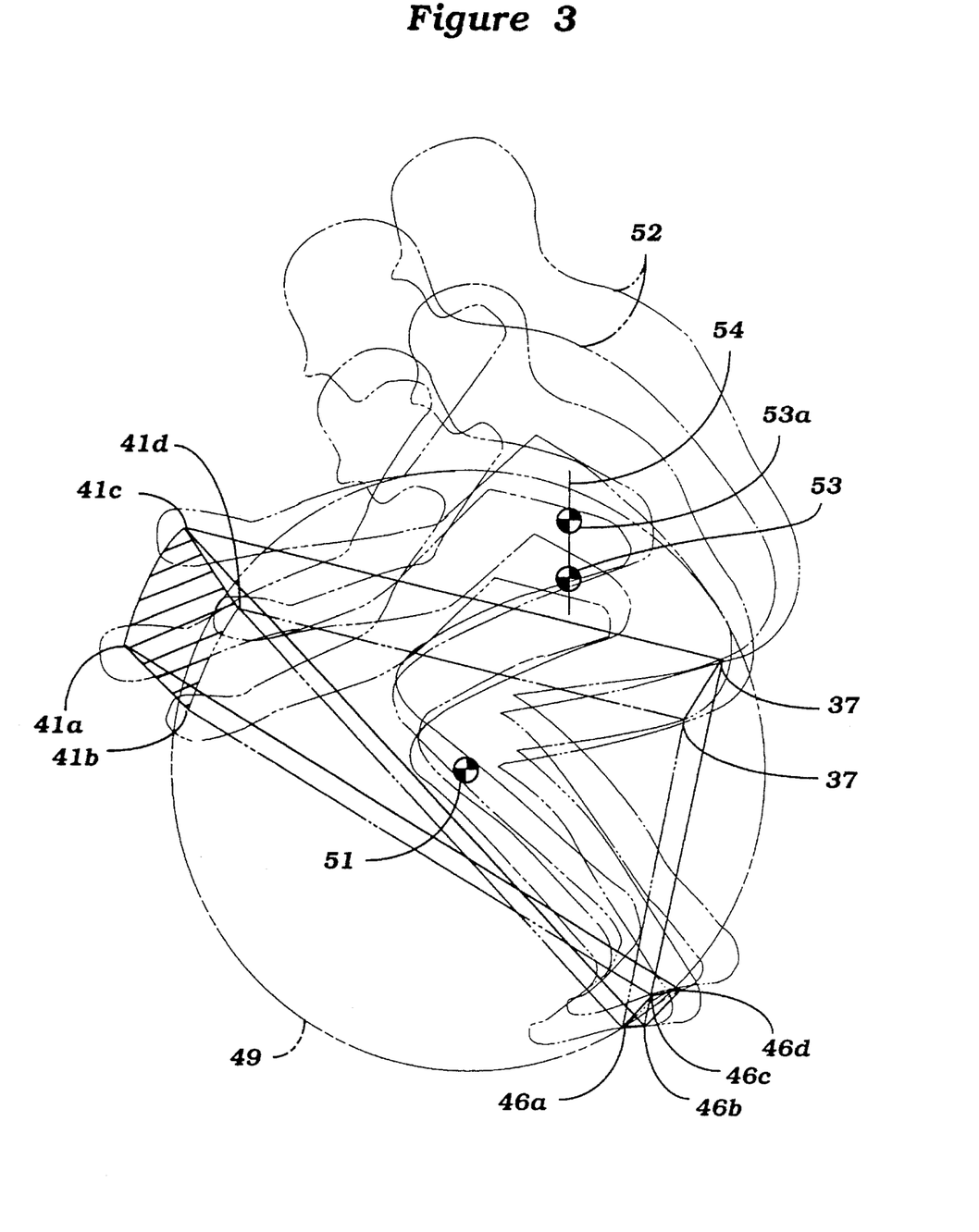
FIG. 3 is a schematic side elevational view showing the range of adjustments of the handlebars, seat and foot pegs so as to accommodate either touring or racing postures and for riders of varying stature.
Figure 14:
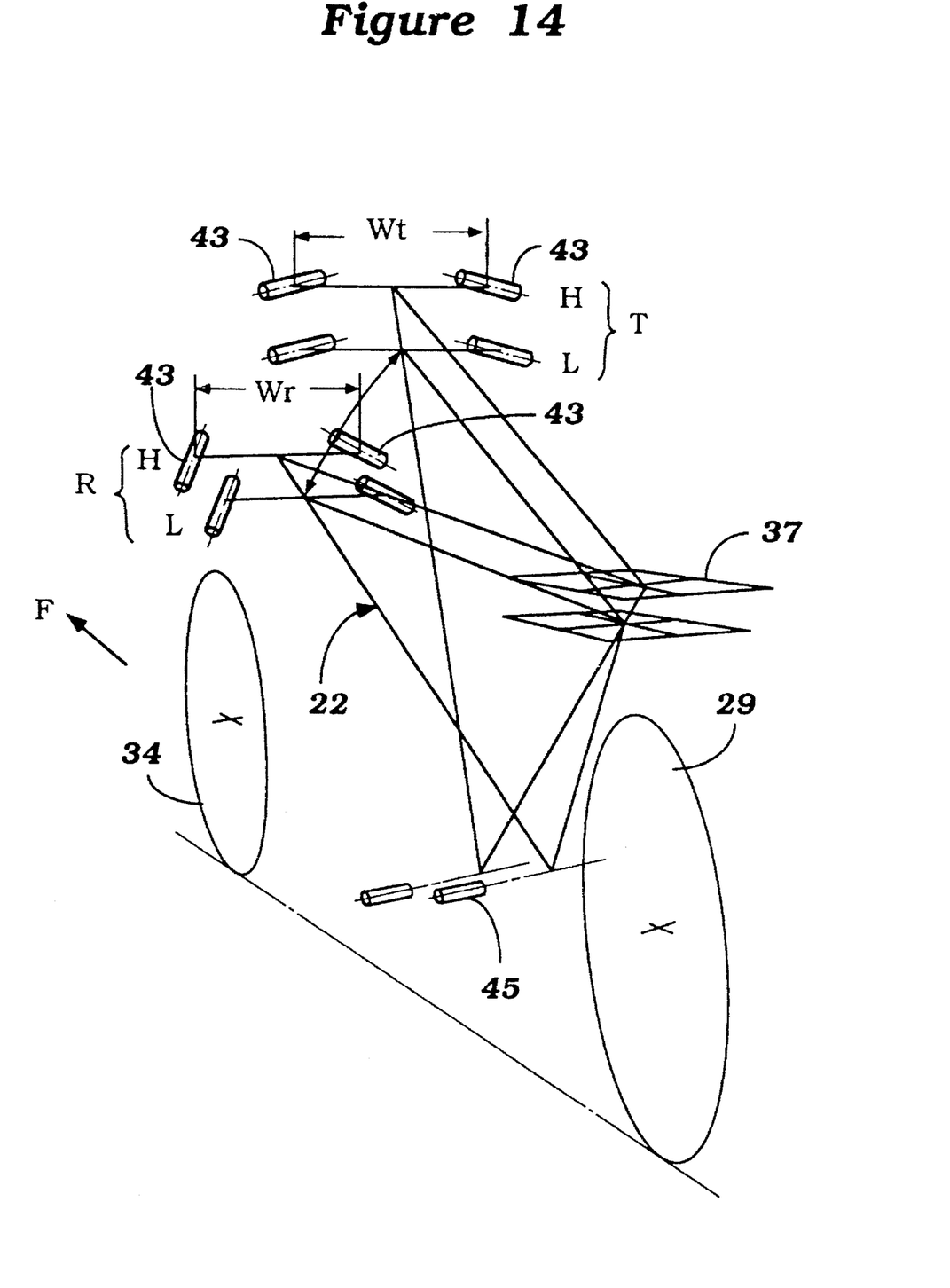
FIG. 14 is a partially schematic view showing the range of adjustments of the various adjustable components of the motorcycle.

As may be seen in FIG. 3, this adjusting mechanism permits the foot pegs 46 to be moved along generally an arc between a position 46a so as to accommodate a tall rider in a touring position, a position 46b to accommodate a short rider in a touring position, a position 46c so as to accommodate a short rider in a racing position and a position 46d to accommodate a tall rider in a racing position. Some of these foot peg positions are also shown in FIG. 14.

Figure 8:
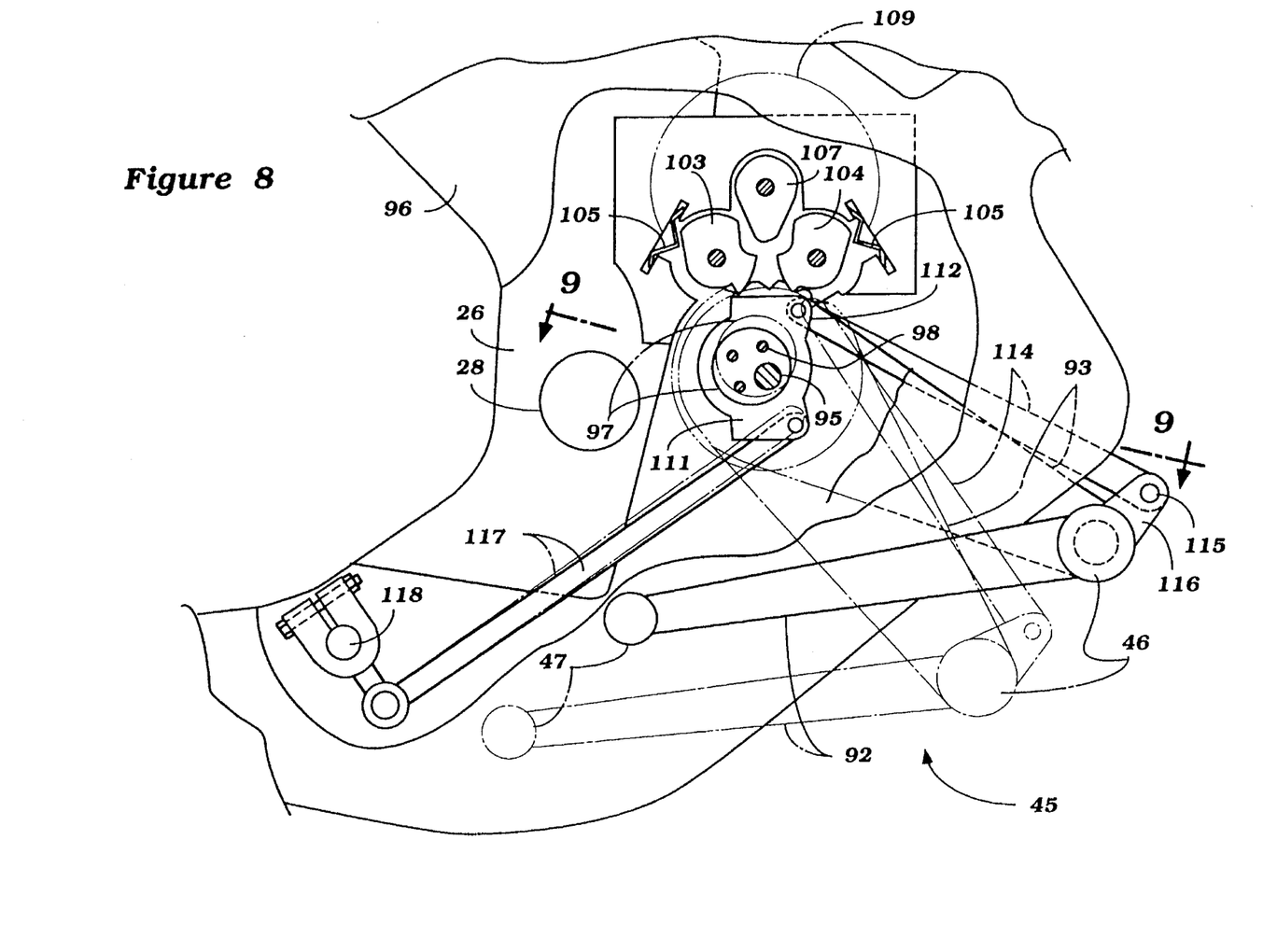
FIG. 8 is a side elevational view, with portions broken away, showing the foot peg adjusting construction.
Figure 9:
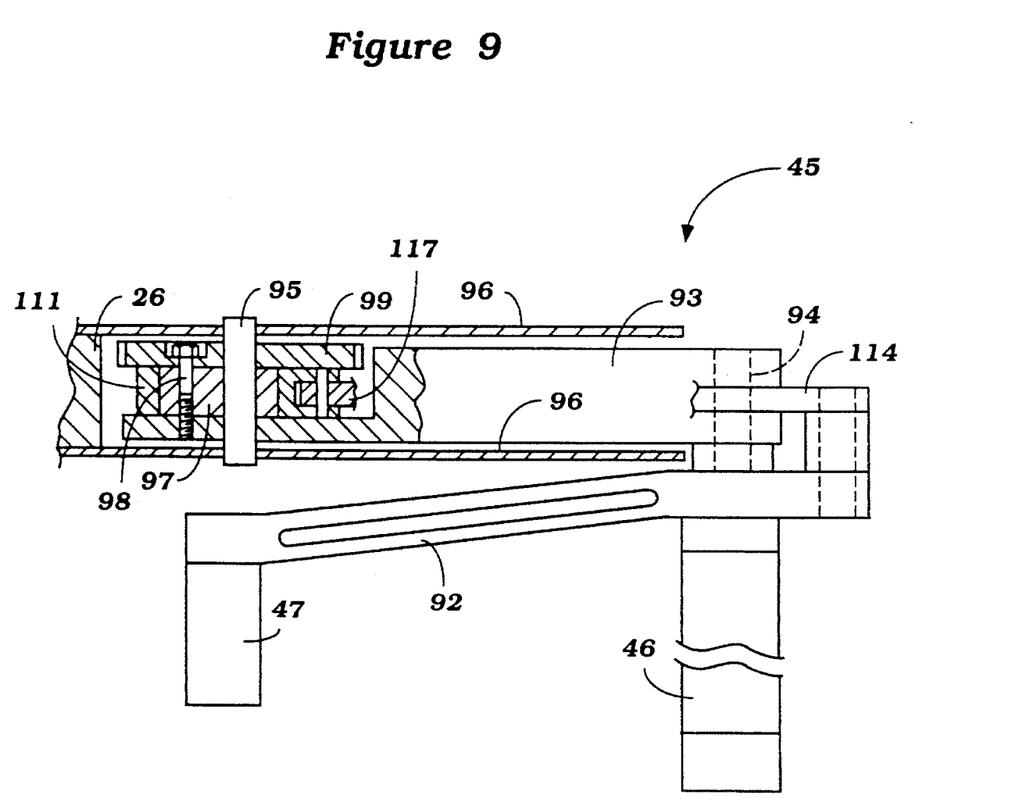
FIG. 9 is an enlarged cross sectional view taken along the line 9—9 of FIG. 8.
Figure 10:
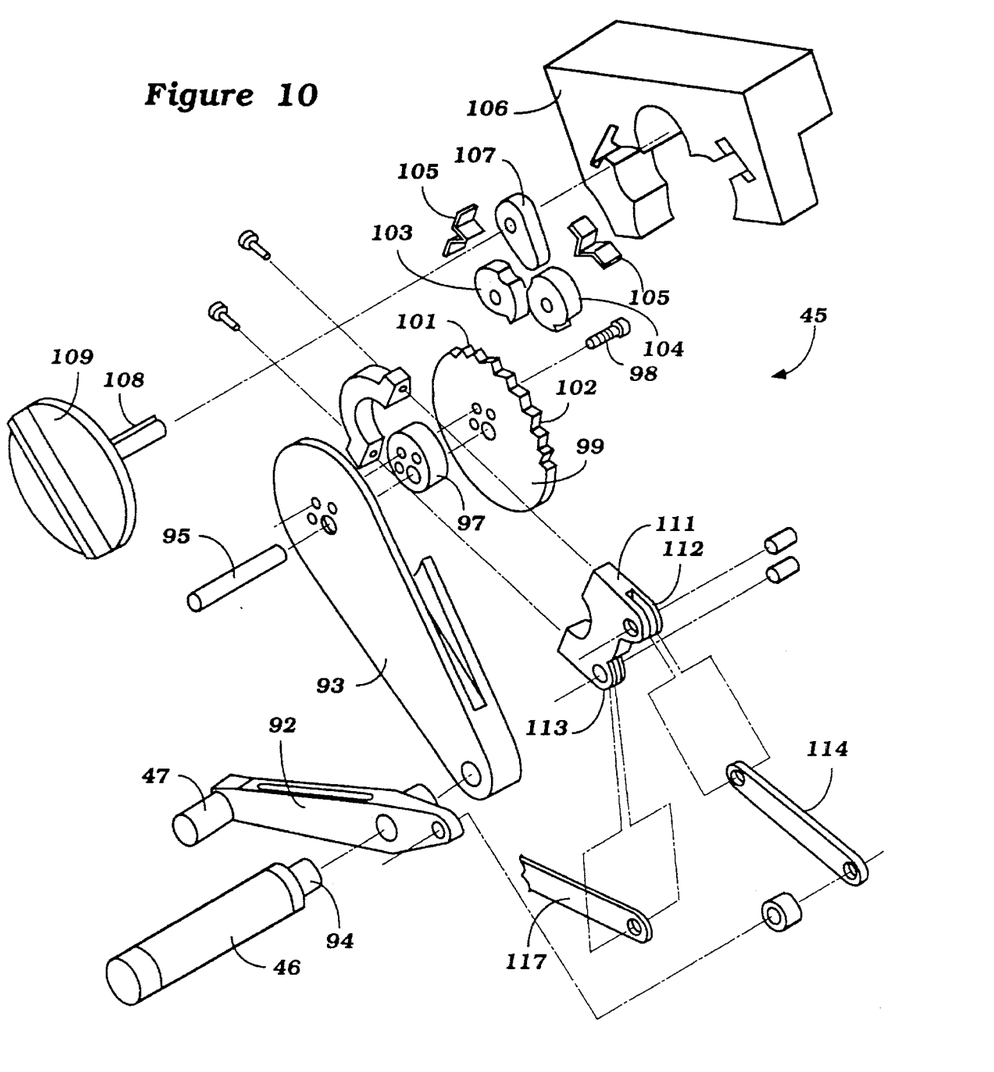
FIG. 10 is an exploded perspective view of the foot peg adjusting mechanism.
Figure 11:
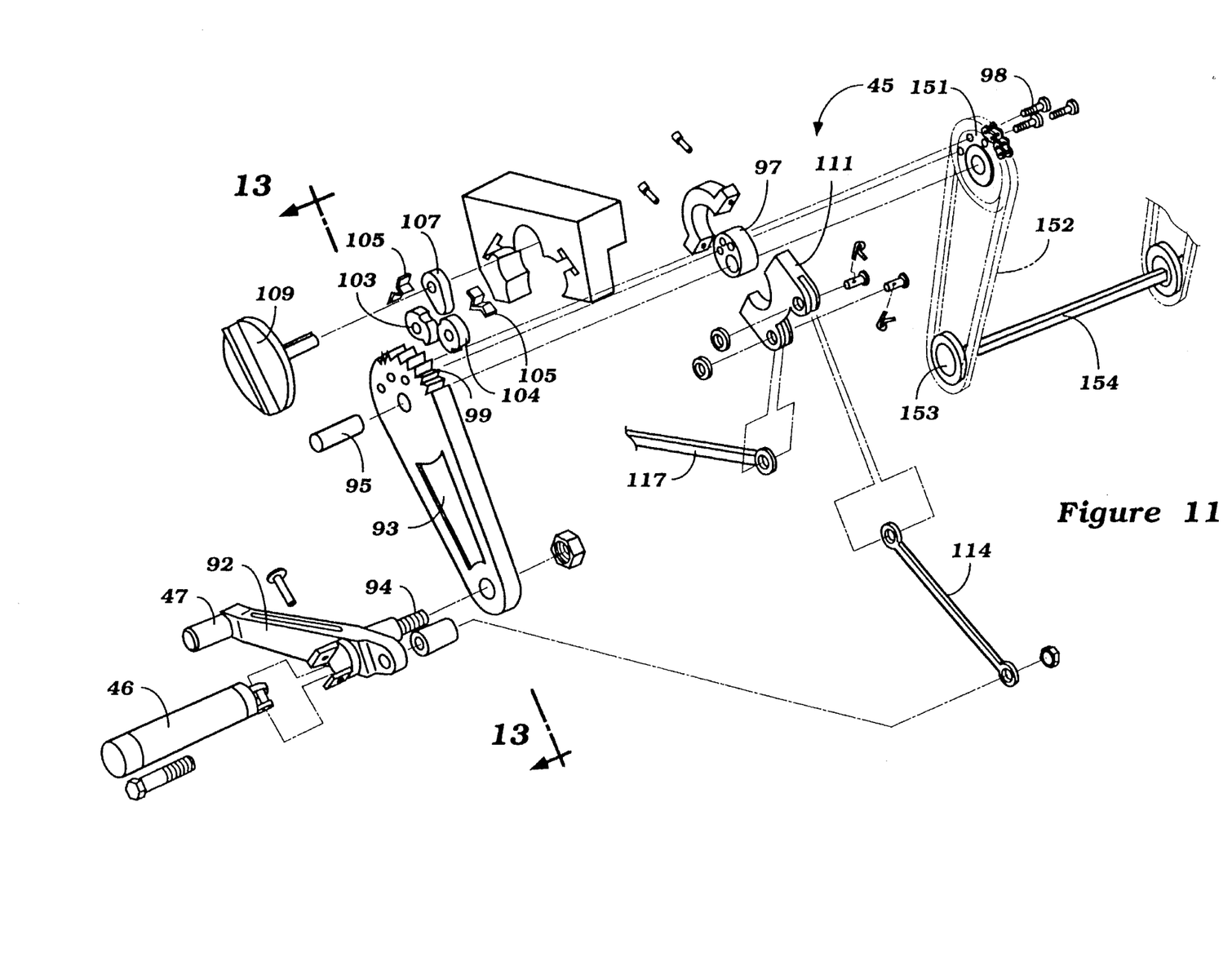
FIG. 11 is an exploded perspective view, in part similar to FIG. 10, showing an embodiment wherein the foot pegs at each side of the motorcycle can be adjusted simultaneously.
Figure 12:
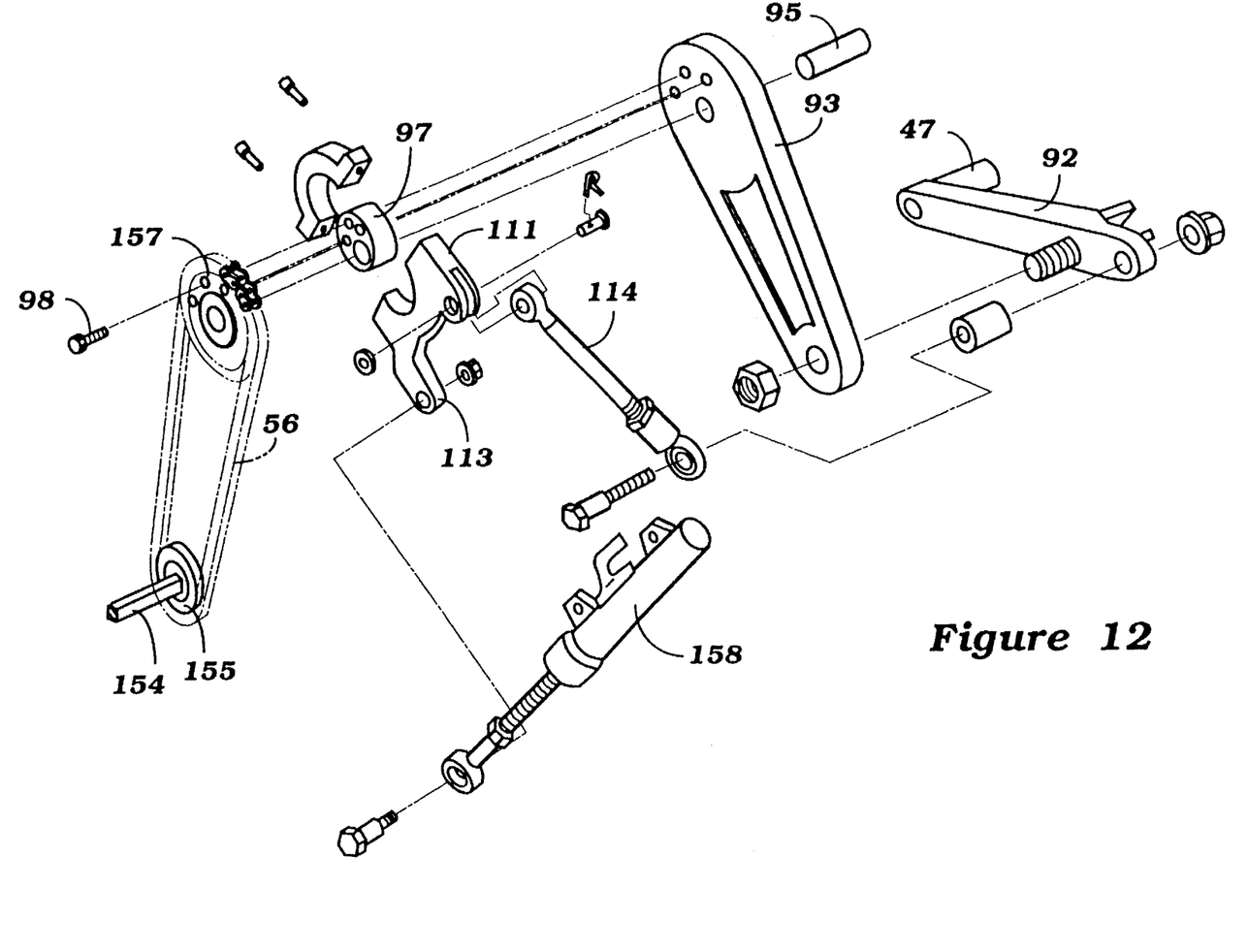
FIG. 12 is a further exploded perspective view showing the remainder of the construction and the foot peg adjustment at the opposite side of the motorcycle.
Figure 13:
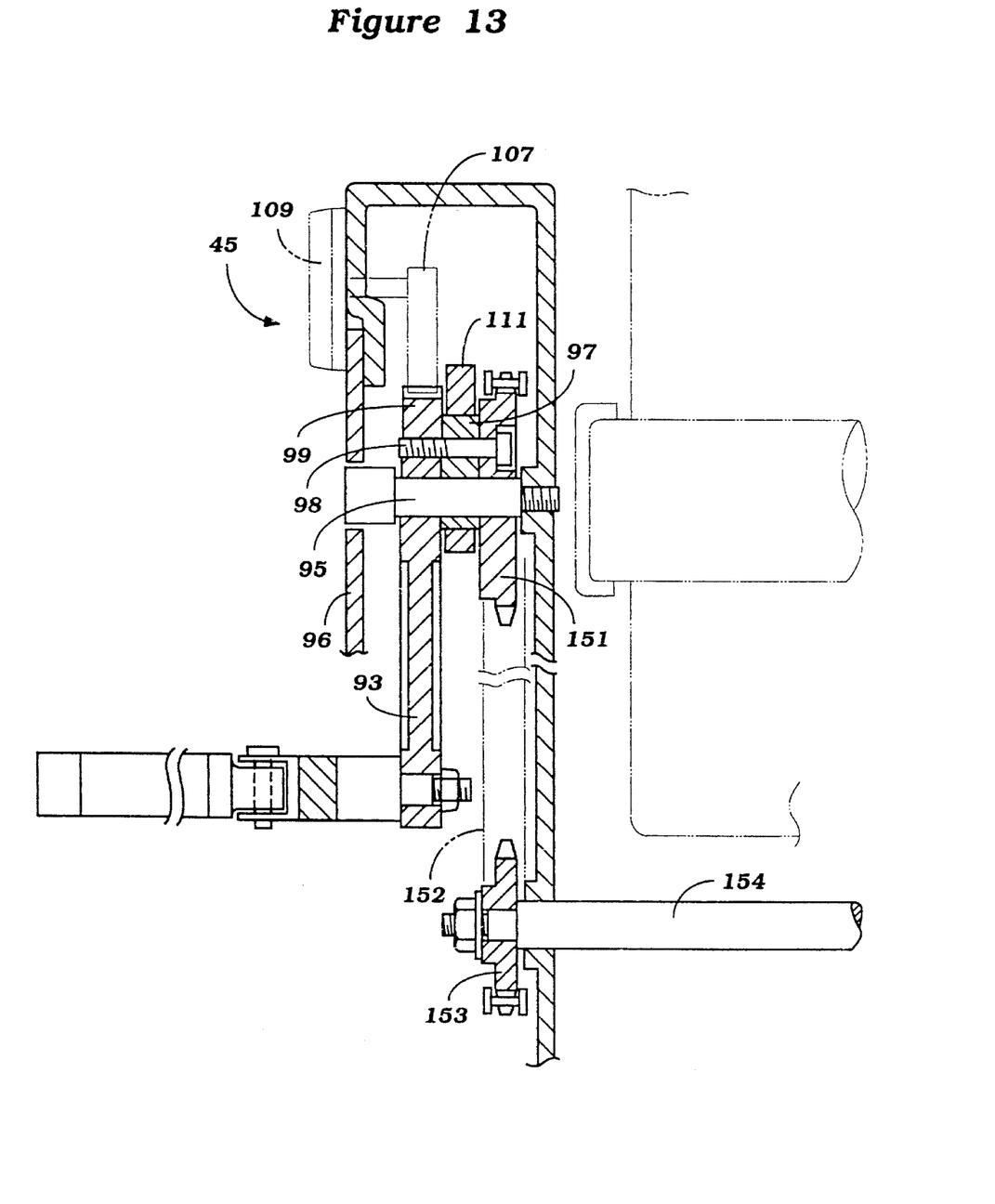
FIG. 13 is an enlarged cross sectional view taken generally along the line 13—13 of FIG. 11.

In the embodiment of FIGS. 8 through 10, the foot pegs 45 at each side of the motorcycle were independently adjustable. Obviously, there are certain advantages to a construction which permits simultaneous adjustment of the foot pegs and FIGS. 11 through 13 show such an embodiment. In this embodiment, the locking mechanism and foot peg construction at one side of the motorcycle is the same as that already described. For that reason, this construction will not be described again in detail. Rather, components of this embodiment which are the same as the previously described embodiment have been identified by the same reference numerals.

In this embodiment, a sprocket 151 is also affixed to the eccentric disk 97 by the fasteners 98. A chain 152 interconnects the sprocket 151 for rotation with a second sprocket 153 that is affixed to a shaft 154. The shaft 154 extends transversely across the width of the motorcycle 21 and has a further sprocket 155 affixed to the end of the shaft 154 adjacent the foot peg assembly 45 at the opposite side of the motorcycle. This foot peg assembly is also affixed and supported in the manner already described to a further adjusting arm 93. Because of the similarity of the construction, components at this side which are the same as those at the opposite side have been identified by the same reference numerals and further description is not believed to be required.

The sprocket 155 drives a chain 156 that drives a further sprocket 157 which is affixed by the fasteners 98 to the eccentric disk 97 associated with the foot pegs at this side. The connection of the disk 97 to the lever 93 is the same and there is also provided a link 114 which is connected to the lever 92 at this side so as to keep the foot pegs in a horizontal position. However, rather than employing the link 117 at this side, the portion 113 of the bearing plate 111 is connected pivotally to an adjusting assembly 158. In all other regards, this embodiment is the same as those previously described.

From the foregoing description, it should be readily apparent that the described embodiments are highly effective in permitting the use of a single motorcycle that can be configured so as to permit a rider to assume either a racing or touring posture. In addition, the construction permits the accommodation of riders of varying stature in either of these positions. Of course, the foregoing description is that of preferred embodiments of the invention. Various changes and modifications may be made without departing from the spirit and scope of the invention, as defined by the appended claims.

We claim:

1. A motorcycle construction for permitting a rider to assume either a crouched, racing position or an upright touring position comprising a frame assembly journaling front and rear wheels, said front wheel being dirigibly supported by said frame assembly for steering of said motorcycle about a first axis, a handlebar assembly, supporting means supporting said handlebar assembly for pivotal movement about a second axis generally parallel to said first axis, means operatively connecting said handlebar assembly to said front wheel for steering of said front wheel about said first axis upon steering movement of said handlebar assembly about said second axis, means for mounting said supporting means for said handlebar assembly and said second axis for adjustment relative to said frame assembly generally within an arc about a third axis extending horizontally and transversely to said frame assembly and behind said first and second axis to a plurality of adjusted positions of said second axis and said handlebar assembly between a lowered, forward position for racing posture and an elevated rearward position for touring posture while maintaining said second axis in a generally upright condition for steering said front wheel in either position of said handlebar assembly and for locking of said handlebar supporting means in any of a plurality of adjusted positions about said third axis.

2. A motorcycle construction as set forth in claim 1 wherein the handlebar assembly includes a pair of handle grips supported at opposite sides thereof.

3. A motorcycle construction as set forth in claim 2 wherein the means for mounting the supporting means of the handlebar assembly includes a linkage assembly.

4. A motorcycle construction as set forth in claim 3 wherein the linkage assembly includes a first link pivotally connected at one end to the supporting means for the handlebar assembly and pivotally connected at its other end to the frame assembly and a second link angularly disposed to the first link and pivotally connected at one end thereof to said supporting means and at the other end thereof to said frame assembly.

5. A motorcycle construction as set forth in claim 1 further including a pair of handle grips pivotally supported on said handlebar assembly about respective fourth and fifth axes for movement between a first position spaced closely toward a longitudinal center line of the motorcycle for racing operation and a second position spaced outwardly from said longitudinal center line for accommodating the rider in a touring position said second, fourth and fifth axes being substantially parallel to each other with said fourth and said fifth axes being on opposite sides of said second axis.

6. A motorcycle construction as set forth in claim 5 wherein the handle grips are simultaneously adjustable relative to the handlebar assembly.

7. A motorcycle construction as set forth in claim 6 further including a geared connection between said handle grips for simultaneous movement thereof.

8. A motorcycle construction as set forth in claim 7 further including locking means for locking said handle grips in an adjusted position.

9. A motorcycle construction for permitting a rider to assume either a crouched, racing position or an upright touring position comprising a frame assembly journaling front and rear wheels, said front wheel being dirigibly supported by said frame assembly for steering of said motorcycle about a first axis, a handlebar assembly having a pair of handle grips supported at opposite sides thereof, supporting means supporting said handlebar assembly for pivotal movement about a second axis generally parallel to said first axis, means operatively connecting said handlebar assembly to said front wheel for steering of said front wheel about said first axis upon steering movement of said handlebar assembly about said second axis, a linkage assembly for mounting said supporting means for said handlebar assembly for movement relative to said frame assembly generally within an arc about a third axis extending horizontally and transversely to said frame assembly and behind said first and second axes between a lowered, forward position for racing posture and an elevated, rearward position for touring posture while maintaining said second axis in a generally upright condition for steering said front wheel in either position of said handlebar assembly, said linkage assembly including a first link pivotally connected at one end to said supporting means for the handlebar assembly and pivotally connected at its other end to said frame assembly and a second link angularly disposed to said first link and pivotally connected at one end thereof to said supporting means and at the other end thereof to said frame assembly, said links being adjustable in length for accommodating riders of different stature in either the touring or racing postures.

10. A motorcycle construction for permitting a rider to assume either a crouched, racing position or an upright touring position comprising a frame assembly journaling front and rear wheels, said front wheel being dirigibly supported by said frame assembly for steering of said motorcycle about a first axis, a handlebar assembly including a pair of handle grips supported at opposite sides thereof, supporting means supporting said handlebar assembly for pivotal movement about a second axis generally parallel to said first axis, means operatively connecting said handlebar assembly to said front wheel for steering of said front wheel about said first axis upon steering movement of said handlebar assembly about said second axis, means for mounting said supporting means for said handlebar assembly for adjustment relative to said frame assembly generally within an arc about a third axis extending horizontally and transversely to said frame assembly and behind said first and second axes to a plurality of adjusted positions between a lowered, forward position for racing posture and an elevated, rearward position for touring posture while maintaining said second axis in a generally upright condition for steering said front wheel in either position of said handlebar assembly and for locking of said handlebar supporting means in any of a plurality of adjusted positions about said third axis, said handle grips being adjustable relative to said handlebar assembly between a first position spaced closely adjacent the longitudinal center line of a motorcycle and a second position spaced outwardly therefrom.

11. A motorcycle construction as set forth in claim 10 wherein the handle grips are simultaneously adjustable relative to the handlebar assembly.

12. A motorcycle construction as set forth in claim 11 wherein the handle grip assemblies are pivotally supported by the handlebar assembly.

13. A motorcycle construction as set forth in claim 12 further including a geared connection between said handle grips for simultaneous movement thereof.

14. A motorcycle construction as set forth in claim 13 further including locking means for locking said handle grips in an adjusted position.

15. A motorcycle construction for permitting a rider to assume either a crouched, racing position or an upright touring position comprising a frame assembly journaling front and rear wheels, said front wheel being dirigibly supported by said frame assembly for steering of said motorcycle, a handlebar assembly operatively connected to said front wheel for steering thereof, means for mounting said handlebar assembly for adjustment relative to said frame assembly generally within an arc about a horizontal axis extending transversely to said frame assembly and rearwardly of said front wheel to a plurality of adjusted positions between a lowered, forward position for racing posture and an elevated, rearward position for touring posture and for locking said handlebar assembly in any of a plurality of adjusted positions while permitting steering of said front wheel by a seated rider in each position, and a foot peg carried by said frame assembly and adapted to accommodate the foot of a rider, said foot peg being adjustably supported by said frame assembly generally along an arc having its center positioned forwardly of said rear wheel between a first position spaced forwardly and downwardly so as to accommodate the touring posture and a second position spaced upwardly and rearwardly of said first position to accommodate the racing posture, the arcs of adjustment of said handlebar assembly and said foot peg lying substantially on the same circle.

16. A motorcycle construction as set forth in claim 15 wherein the foot peg assembly comprises a pair of spaced apart pins carried by a lever.

17. A motorcycle construction as set forth in claim 16 further including means for pivoting the lever upon movement between the first and second positions of the foot pegs so as to maintain the foot pegs in a substantially horizontal position.

18. A motorcycle construction as set forth in claim 17 further including a seat adjustably carried by the frame assembly for accommodating a rider.

\* \* \* \* \*